[19] United States Patent
Daugirda et al.

[11] Patent Number: 4,676,199
[45] Date of Patent: Jun. 30, 1987

[54] HIGH EFFICIENCY WATER HEATER CONSTRUCTION

[75] Inventors: Paul G. Daugirda, Evergreen Park; Wilbur L. Haag, Jr., Palos Hills, both of Ill.

[73] Assignee: Rheem Manufacturing Company, New York, N.Y.

[21] Appl. No.: 849,147

[22] Filed: Apr. 7, 1986

[51] Int. Cl.[4] ............................................. F22B 5/00
[52] U.S. Cl. ..................... 122/17; 122/18; 122/19; 122/235 R
[58] Field of Search ................. 122/13 R, 14, 16–19, 122/209 R, 271, 272, 235 R; 126/361, 362

[56] References Cited

U.S. PATENT DOCUMENTS

| | | | |
|---|---|---|---|
| 890,237 | 6/1908 | Kennepohl | 122/17 |
| 1,126,248 | 1/1916 | Howie et al. | 122/18 |
| 1,410,583 | 3/1922 | Lewis | 122/18 |
| 1,552,292 | 9/1925 | Fuller | 122/16 |
| 1,827,521 | 10/1931 | Heathman | 122/19 |
| 1,920,685 | 8/1933 | Evans | 122/19 |
| 1,961,231 | 6/1934 | Maier | 122/17 |
| 1,961,723 | 6/1934 | Wilson | 122/18 |
| 2,003,742 | 6/1935 | Elliott | 122/17 |
| 2,024,437 | 12/1935 | Eisnga | 122/17 |
| 2,089,734 | 8/1937 | Czeschin | 122/18 |
| 2,374,757 | 5/1945 | Koppel | 122/17 |
| 2,408,820 | 10/1946 | Stamin | 122/17 |
| 2,411,675 | 11/1946 | Alexander | 122/17 |
| 2,440,998 | 5/1948 | Alexander | 122/18 |
| 2,478,836 | 8/1949 | Riley | 122/18 |
| 2,549,755 | 4/1951 | Burwell | 122/19 |
| 2,814,279 | 11/1957 | Thomas | 122/18 |
| 3,351,130 | 11/1967 | Lowe | 165/39 |
| 3,604,400 | 9/1971 | Sharan | 122/235 R |
| 3,608,527 | 9/1971 | Stiefel | 122/235 R |
| 3,789,805 | 2/1974 | Williams | 122/235 R |
| 4,355,602 | 10/1982 | Cooke | 122/235 R |
| 4,390,008 | 6/1983 | Andrews | 126/427 |
| 4,401,100 | 8/1983 | Slater et al. | 126/362 |
| 4,438,728 | 3/1984 | Fracaro | 122/14 |
| 4,484,564 | 11/1984 | Erickson | 126/365 |
| 4,503,810 | 3/1985 | Fujishita et al. | 122/13 R |

Primary Examiner—Henry C. Yuen
Attorney, Agent, or Firm—Allegretti, Newitt, Witcoff & McAndrews, Ltd.

[57] ABSTRACT

A multistage gas fired water heater includes a primary heating tank and a secondary tank mounted vertically over the primary tank with a plurality of primary flues located within the primary heating tank aligned with secondary flues located within the secondary tank. One of the primary flues is constructed to operate as a condensate removal pipe for draining water which forms in the secondary flues. The designated condensate removal pipe prevents water from trickling down the other primary flues or collecting in the flue manifold.

4 Claims, 7 Drawing Figures

FIG. 5
FIG. 6
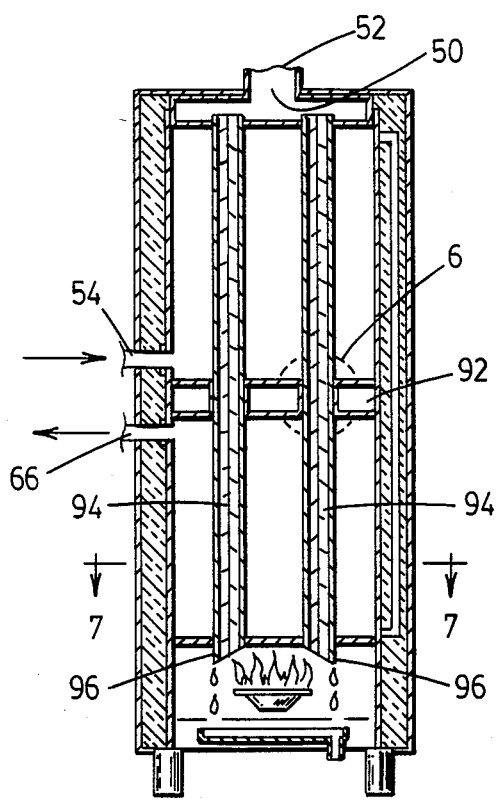
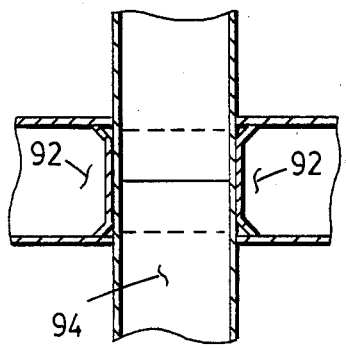
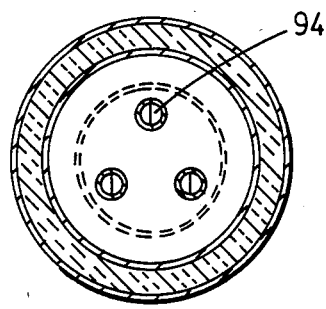
FIG. 7

HIGH EFFICIENCY WATER HEATER CONSTRUCTION

BACKGROUND OF THE INVENTION

In a principal aspect, the present invention relates to a high efficiency, multistage liquid heating apparatus utilizing combustible fuel as a heat source.

In a liquid heating apparatus, such as a water heater, the liquid to be heated typically is introduced into the lower portion of a tank. As the liquid is heated, it becomes less dense, thereby rising to the top of the tank where it is drawn off.

A heat source for such an apparatus may be a combustible fuel such as natural gas that is burned in a combustion chamber located beneath the tank. The hot gases produced by combustion rise through flues that pass through the tank and serve as a heat exchanger to conduct the heat from the rising hot gas to the liquid inside the tank. Since heat is removed from the hot gas as it moves upward, the temperature of the gas within the flues decreases as it rises. Thus, the temperature difference, and consequently the rate of heat transfer between the hot gas and the liquid to be heated is greatest at the bottom of the tank, and least at the top of the tank.

Historically, multiple staging of liquid apparatae that utilize combustible fuel as a heat source has been commonly employed to increase the theoretical efficiency of heat transfer. In a multiple stage liquid heating apparatus, the coldest liquid enters the uppermost tank and is transferred through successively lower tanks in a serial fashion. This raises the theoretical efficiency of the apparatus because a large temperature difference between the liquid to be heated and the hot gas is maintained throughout the length of the liquid heating apparatus.

A problem associated with a multistage gas fired water heater is that the water vapor formed as a product of combustion condenses in the flues of the upper stages. This is because the cooler rising flue gas contacts the tanks containing the cold water to be heated. The condensate forms water droplets which trickle down the inner walls of the flues. The water eventually trickles down the inner walls of the lower stages. Such condensation not only encourages corrosion of the flue and tank and interrupts the upward movement of hot gases, it also decreases the heat transfer coefficient of the apparatus and thereby reduces its efficiency. The thin film of water that forms on the surface of the flues is responsible for lowering the real heat transfer efficiency of the apparatus.

Another problem associated with multistage liquid apparatae is that the presence of complex flue assemblies interferes with the ability to clean the flues. Since the flues communicate the by-products of combustion from the burner to the exhaust manifold, carbonaceous build-up in the flues is inevitable. Failure to remove this build-up will result in a lower heat transfer efficiency for the apparatus.

The present invention constitutes a multistage liquid heating apparatus that seeks to overcome the problems resulting from water vapor condensation in the upper flues while at the same time providing a simple, easily constructed design that is more easily cleaned.

SUMMARY OF THE INVENTION

Briefly, the present invention comprises a multistage, combustible fuel fired liquid heating apparatus of the type employing heat transfer flues through the liquid tanks and including the improvement of a condensate removal pipe to substantially reduce the presence of water on the inside walls of the flues. The successive tanks of the apparatus are vertically arrayed with substantially linear, vertically aligned flue passages.

Thus, it is an object of the present invention to provide a multistage liquid heating apparatus wherein the presence of water in the flues is substantially reduced, thereby increasing the real heat transfer efficiency of the apparatus.

A further object of the present invention is to provide a multistage liquid heating apparatus that is less susceptible to corrosion.

A further object of the present invention is to provide a multistage liquid heating apparatus that is simple and inexpensive to construct, and does not require elaborate plumbing.

Yet another object of the present invention is to provide a multistage liquid heating apparatus that is easily cleaned.

These and other objects, advantages and features of the present invention will be set forth in the detailed description which follows.

BRIEF DESCRIPTION OF THE DRAWING

In the detailed description which follows, reference will be made to the drawing comprised of the following figures:

FIG. 5 is a side cross-sectional view illustrating a second preferred embodiment of the apparatus;

FIG. 6 is an enlarged side cross-sectional view of the second preferred embodiment illustrating the flue construction of the apparatus; and FIG. 7 is a top plan cross-sectional view of the second preferred embodiment showing the flue positioning.

DETAILED DESCRIPTION OF PREFERRED EMBODIMENTS

Figure 4:
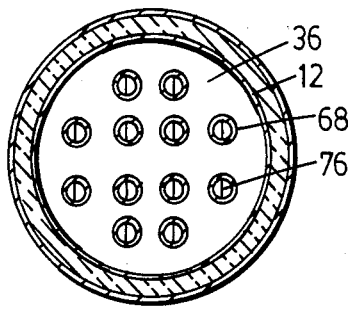
FIG. 4 is a top plan cross-sectional view of the first preferred embodiment showing the flue positioning.

A first preferred, specific embodiment of the present invention is illustrated in FIGS. 1 through 4, and is a two-stage gas fired water heater 10 having a primary stage tank 12 and a secondary stage tank 14. A burner 16 in a combustion chamber 18 is located below the primary stage tank 12. The burner 16 is designed to combust natural gas in the combustion chamber 18 thereby producing a heated gas 20 including water vapor 22. Airflow through the combustion chamber 18 is induced by either natural convection or by use of a forced draft unit 24. The tanks 12, 14 and chamber 18 are surrounded by a layer of insulation 26 and a protective shell 28.

The primary heating tank 12 includes an upper header 30, a lower header 32, and a connecting cylindrical body or shell 34 which are joined together to define a first reservoir 36. The lower header 32 defines the upper limit of the combustion chamber 18.

The secondary tank 14 includes a top header 38, a bottom header 40, and a secondary cylindrical body or shell 42 joined together to define a second reservoir 44. The bottom header 40 of tank 14 is joined to the upper header 30 to define an intermediate manifold 46. Thus, the headers 30, 40 are formed as opposed concave members which are joined about their outer periphery to define the manifold 46.

The top header 38 cooperates with a concave gas collector 48 to define an exhaust manifold 50 at the top of tank 14. A flue outlet 52 is provided in collector 48.

A liquid inlet 54 feeds into the secondary stage tank 14 at the lower portion or bottom of the secondary tank 14. Inlet 54 defines liquid supply means 56 for introducing a liquid 58 to be heated into the lower portion of the secondary stage tank 14.

A secondary liquid outlet 60 located at the upper portion of the secondary cylindrical tank 14 is connected to a conduit 62 which, in turn, is connected to a primary liquid inlet 64 located at the lower portion of the primary stage tank 12. The secondary liquid outlet 60, the conduit 62, and the primary liquid inlet 64 provide a transfer means for transferring the liquid 58 being heated from the upper portion of the secondary stage tank 14 to the lower portion of the primary stage tank 12. It is understood that a multiplicity of secondary liquid outlets 60, conduits 62 and/or primary liquid inlets 64 can be provided.

A primary liquid outlet 66 located at the upper portion of the primary tank 12 defines outlet means for removing the heated liquid 58 from the upper portion of the primary tank 12.

A plurality of primary flues 68 extend between headers 30, 32 through the primary stage tank 12. These primary flues 68 communicate with the combustion chamber 18 and the manifold 46.

A plurality of secondary flues 70 extend between headers 38, 40 through the secondary stage tank 14. These secondary flues 70 communicate with the manifold 46 and the flue gas collector 48. Each of the primary flues 68 operatively associates with one of the secondary flues 70 and is aligned to define a linear, correlative flue passageway 72 having a central axis 74.

Figure 2:
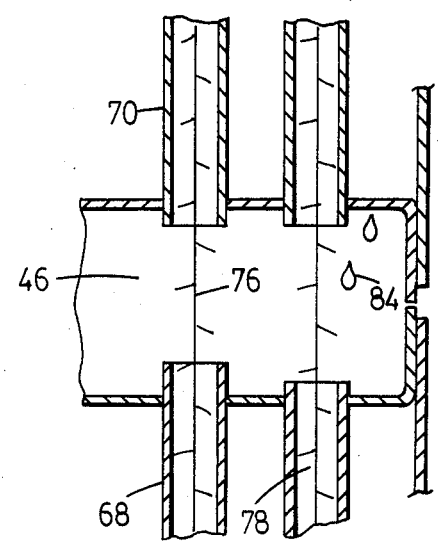
FIG. 2 is an enlarged side cross-sectional view of the first preferred embodiment illustrating the flue construction of the apparatus.
Figure 1:
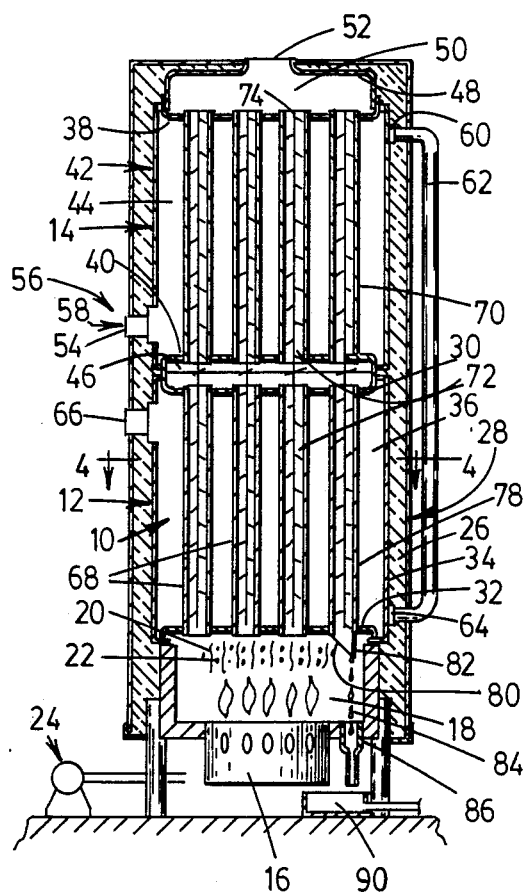
FIG. 1 is a side cross-sectional view illustrating a first preferred embodiment of the apparatus.
Figure 3:
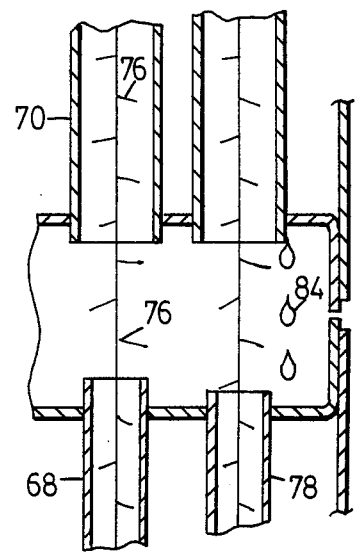
FIG. 3 is an enlarged side cross-sectional view of the first preferred embodiment similar to FIG. 2 illustrating the flue construction.

Baffles 76 extend through each primary flue 68, the manifold 46, and each secondary flue 70 along central axes 74. The primary flues 68 may have substantially smaller primary diameters than the diameters of the secondary flues 70, as shown in FIGS. 1 and 2.

Each of the primary flues 68 extends upward into the manifold 46 and above the header 30. One of the primary flues 68 is foreshortened relative to the other flues 68 and defines a condensate removal pipe 78. The condensate removal pipe 78 has a bias cut lower end 80 located within the combustion chamber 18. The lower end 80 is biased by effecting an angular cut of the tubing forming the condensate removal pipe 78. This angled cut forms an angle sufficiently acute to allow water to form at the lowermost tip. The lowermost tip 82 of the flue 68 defines a pathway for condensed water 84. Preferably, the tip 82 is adjacent an inner wall of chamber 18 to avoid dripping onto a burner.

A condensate receptacle 86 is located directly below the tapered end 80 of the condensate removal pipe 78. A conduit 88 is located at the bottom of the condensate receptacle 86. The condensate receptacle 86 and the conduit 88 provide drainage means for receiving and discharging water from the condensate removal pipe 78. A collection pan 90 may be directly underneath the conduit 88.

The apparatus operates as follows: liquid 58 to be heated enters the lower portion of the secondary stage tank 14, flows through the tank 14 and is transferred from the upper portion of the secondary stage tank 14 to the lower portion of the primary stage tank 12 by means of one or more conduits 62. The liquid 58 is withdrawn from the upper portion of the primary tank 12.

The fuel is combusted by the burner 16 in the combustion chamber 18 to produce the heated gases 20 which include water vapor 22. The heated gases rise 20 from the combustion chamber 18 through the primary flues 68 and into the intermediate manifold 46, and then through the secondary flues 70, into the concave gas collector 48 and out the flue outlet 52. The heated gases 20 rise, either due to convection or by means of blowing forced draft unit 24. Baffles 76 cause the flow of the heated gas 20 to be substantially turbulent. The water vapor 22 contained in the secondary flues 70 condenses forming water 84. The water 84 trickles down the secondary flues 70 and collects in the manifold 46. After a small amount of water 84 collects in the intermediate manifold 46, it flows down the condensate removal pipe 78, where the water flows off the tapered end 82 of the condensate removal pipe 78, and into the condensate receptacle 86. The water 84 can be removed from the condensate receptacle 86 through conduit 88. The conduit 88 may be directed to collection pan 90 where the water 84 must then be directed to a drain or conduit 88 may be directed directly to a drain.

A second preferred, specific embodiment is illustrated in FIGS. 5 through 7, and is similar to the first preferred embodiment. However, the intermediate manifold 46 of the first preferred embodiment is omitted and replaced with an insulated spacer 92. Moreover, the primary flues 68 and the secondary flues 70 are omitted and replaced by continuous flues 94, each of which has a lower end 96 which is tapered by effecting an angular cut of the tubing.

While there have been shown preferred embodiments, the invention is to be limited only by the following claims and their equivalents.

What is claimed is:

1. A multistage liquid heating apparatus comprising, in combination:
    a housing;
    burner means, within said housing, for burning a fuel and producing a heated gas including water vapor;
    a primary heating tank substantially adjacent and above said burner means;
    a secondary heating tank above said primary heating tank;
    a manifold interposing said primary heating tank and said secondary heating tank;
    liquid supply means for supplying a liquid to be heated to said secondary tank;
    transfer means for transferring said liquid from said secondary heating tank to said primary tank;
    outlet means for withdrawing liquid from said primary tank;
    a plurality of primary flues extending through said primary tank partially into said manifold, said primary flues communicating with said burner housing to receive heated gas, said primary flues being in heat transfer relationship with said liquid within said primary tank;

a plurality of secondary flues equal or greater in number to the primary flues, said secondary flues extending through said secondary heating tank and from said intermediate manifold, said secondary flues being in heat transfer relationship with said liquid within said secondary tank;

each one of said primary flues being aligned with one of the secondary flues to define a substantially linear flue passageway;

one of said primary flues extending a lesser distance into the manifold than the other primary flues to define a condensate removal pipe from the manifold, to drain water from said manifold into the housing; and drainage means in the housing for receiving and discharging water from said condensate removal pipe.

2. Apparatus according to claim 1 including baffle means in each flue extending along central axes from the bottom of the primary tank to the top of the secondary tank.

3. A multistage liquid heating apparatus according to claim 1 wherein said primary flues having substantially smaller diameters than secondary flues.

4. A multistage liquid heating apparatus according to claim 1 wherein said condensate removal pipe includes a tapered end in proximity with said housing.

* * * * *